UNITED STATES PATENT OFFICE.

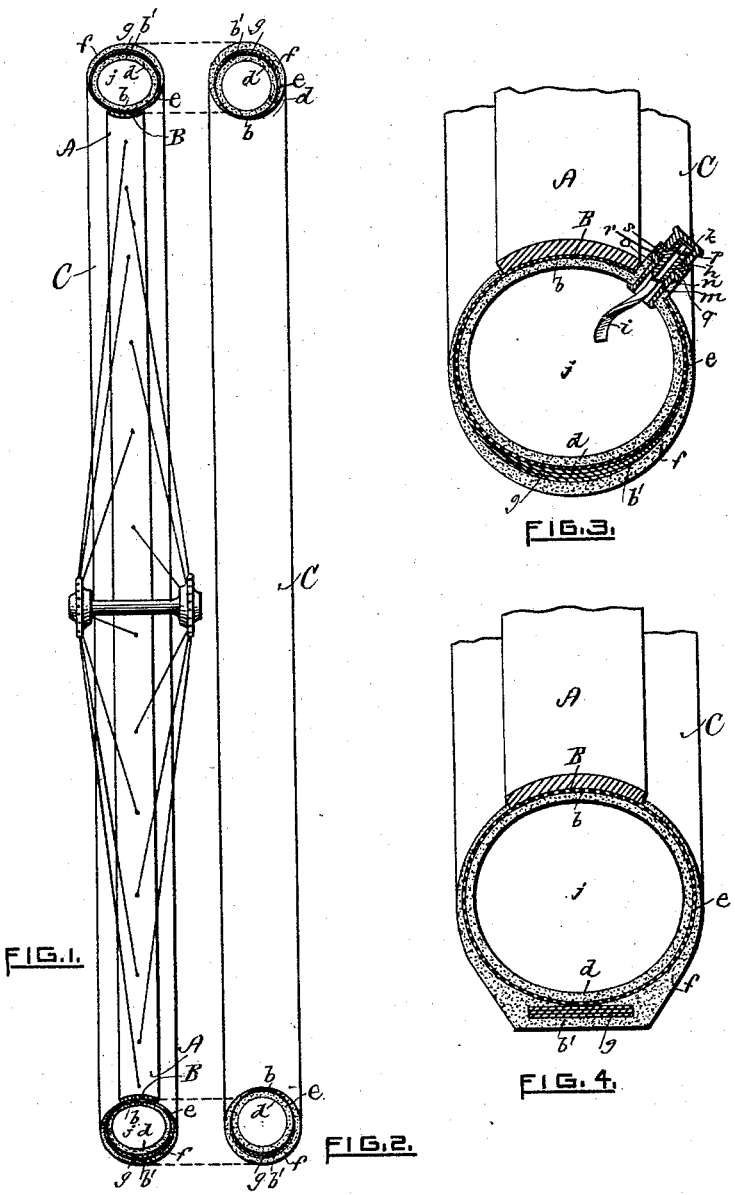

PARDON W. TILLINGHAST, OF PROVIDENCE, RHODE ISLAND.

PNEUMATIC TIRE.

SPECIFICATION forming part of Letters Patent No. 473,798, dated April 26, 1892.

Application filed June 22, 1891. Serial No. 397,137. (No model.) Patented in England July 7, 1891, No. 11,534.

*To all whom it may concern:*

Be it known that I, PARDON W. TILLINGHAST, a citizen of the United States, residing at Providence, in the State of Rhode Island, have invented a new and useful Improvement in Pneumatic Tires for the Wheels of Vehicles, (patented in Great Britain under date of July 7, 1891, No. 11,534,) of which the following is a specification.

Heretofore in the employment of pneumatic tires for the wheels of vehicles it has been deemed necessary to employ either special means for fastening the tire to the rim of the wheel, as by ribs or flaps, or to form the rim with a nearly-semicircular groove to receive the inner side of the annular tire, and in this latter case the projecting edges of the rim interfere with the proper yielding action of the sides of the tire; and it is the object of my invention to dispense with the special fastening means and to firmly retain the tire upon a rim having a comparatively shallow groove without resorting to attaching ribs or flaps, as heretofore; and my invention consists in an annular pneumatic tire, made of less interior diameter of the rim of the wheel at the bottom of the shallow holding-groove and provided with a valved opening for inflating the tire when stretched upon the rim, and having a yielding inner wall adapted for extension longitudinally to embrace the groove of the rim and an inclosed non-extensible reinforcement in the outer peripheral wall to prevent the corresponding extension of the outer wall when subjected to the pressure of inflation upon the rim of the wheel.

Figure 1 represents a transverse vertical section of a vehicle-wheel having a grooved rim adapted to receive the pneumatic tire. Fig. 2 represents a transverse vertical section of the pneumatic tire made smaller than the groove of the rim. Fig. 3 represents an enlarged transverse section of the pneumatic tire and the rim of the wheel, also showing the valve-opening for inflating the tire. Fig. 4 represents an enlarged transverse section of the tire and rim, showing a modification.

In the accompanying drawings, A, Fig. 1, represents the rim of the vehicle-wheel, provided with a shallow holding-groove B, in which the tire is to be placed. The annular pneumatic tire C, Fig. 2, is so formed that the diametrical distance between its opposite inner walls $b\ b$ is less than the diameter of the wheel at the bottom of the groove B, as shown by the dotted lines, so that the inner wall of the tire must be stretched to cause it to properly embrace the rim and rest firmly in the holding-groove B. The tire C is preferably formed of an inner tube $d$ of rubber with a covering of thin canvas $e$, so applied as to prevent the tire from bursting, yet allowing a slight longitudinal stretching of the wall of the tube $d$, and with an outer covering $f$ of rubber, which forms the wearing tread of the tire, and with an intervening non-extensible reinforcement $g$ of canvas or any other suitable textile material, which serves to prevent the longitudinal stretching of the outer wall $b$ of the tire when the tire is subjected to the pressure of inflation upon the rim. The tire C is also provided with the inserted bushing $m$, having an interior screw-thread $n$, which is adapted to receive the exterior screw-thread $o$ of the valve-tube $h$, through the bore $p$ of which air can be forced for the proper inflation of the tire, the flat collapsing tube $i$, which is attached to the inner end of the valve-tube $h$, serving to prevent the escape of air from the chamber of the tire through the bore $p$ of the said tube. When the tire has been fully inflated, the inclosed non-extensible reinforcement $g$, which may be made of any suitable textile fabric, will prevent the increase of the diameter of the outer circumferential wall $b'$, thus causing the pressure of the air contained in the closed chamber $j$ of the tire to be fully exerted against the inner wall $b$ and the bottom of the groove B to hold the tire in place against laterally-directed strain, as is caused by the weight of the rider in turning a curve, and by a glancing blow against an obstacle in the track, and imparting an oval form to the cross-section of the tire, as shown in the drawings, thus favoring the yielding flexure of the side walls of the tire.

In Fig. 3 the reinforcement $g$ is shown as applied in curved form to fit against the covering $e$ of the tube $d$; but when the tire is made with a flat tread, as shown in Fig. 4, an inclosed flat band $g$ may be employed to prevent the extension of the outer wall by the pressure of the air in the chamber of the tire. The reinforcement $g$, when made of canvas or other suitable textile material, favors the local yielding of the tread portion of the tire in passing over rounded or angular objects in the road, and does not tend to stiffen the tread portion, so as to prevent the said local yielding, as in the case of the employment of metal bands.

I claim as my invention—

The combination, with the vehicle-wheel provided with a groove for holding the tire, of an annular pneumatic tire made of less interior diameter than the diameter of the wheel at the bottom of the holding groove or seat for the tire and provided with a valve for the purpose of inflation, and also having its inner wall stretched to embrace the holding-groove, and having a non-tensible reinforcement of textile material inclosed within its outer wall and adapted to prevent the corresponding extension of the said wall when subjected to the pressure of inflation, substantially as described.

PARDON W. TILLINGHAST.

Witnesses:
S. SCHOLFIELD,
C. F. SCHMELZ.